(12) United States Patent
Tamagno et al.

(10) Patent No.: US 7,823,133 B2
(45) Date of Patent: Oct. 26, 2010

(54) SMART CARD DEVICE AND METHOD FOR DEBUG AND SOFTWARE DEVELOPMENT

(75) Inventors: David Tamagno, Austin, TX (US); Jerome Tournemille, Austin, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 2125 days.

(21) Appl. No.: 10/421,044

(22) Filed: Apr. 23, 2003

(65) Prior Publication Data

US 2004/0215471 A1 Oct. 28, 2004

(51) Int. Cl.
G06F 9/44 (2006.01)
G06F 11/00 (2006.01)

(52) U.S. Cl. .......... 717/127; 717/131; 714/30; 714/31; 714/34; 714/35; 714/37

(58) Field of Classification Search .......... None
See application file for complete search history.

(56) References Cited

U.S. PATENT DOCUMENTS

| | | | | |
|---|---|---|---|---|
| 5,847,372 A | 12/1998 | Kreft | | 235/492 |
| 5,991,546 A | 11/1999 | Chan et al. | | 395/882 |
| 6,070,208 A | 5/2000 | Brief | | 710/104 |
| 6,122,676 A | 9/2000 | Brief et al. | | 710/9 |
| 6,157,966 A * | 12/2000 | Montgomery et al. | | 710/8 |
| 6,168,077 B1 | 1/2001 | Gray et al. | | 235/375 |
| 6,173,355 B1 | 1/2001 | Falik et al. | | 710/129 |
| 6,311,294 B1 | 10/2001 | Larky et al. | | 714/44 |
| 6,439,464 B1 | 8/2002 | Fruhauf et al. | | 235/492 |
| 6,547,150 B1 * | 4/2003 | Deo et al. | | 235/492 |
| 6,718,412 B2 * | 4/2004 | Purcell et al. | | 710/109 |
| 6,732,301 B1 * | 5/2004 | Landry et al. | | 714/43 |
| 6,738,929 B2 * | 5/2004 | Swoboda et al. | | 714/28 |
| 6,915,416 B2 * | 7/2005 | Deng et al. | | 712/227 |
| 6,938,244 B1 * | 8/2005 | Perlin et al. | | 717/125 |
| 6,948,098 B2 * | 9/2005 | Pillay et al. | | 714/34 |
| 2002/0046016 A1 | 4/2002 | Debling | | 703/28 |
| 2002/0065646 A1 | 5/2002 | Waldie et al. | | 703/26 |
| 2002/0065966 A1 | 5/2002 | Brief | | 710/100 |
| 2002/0066791 A1 | 6/2002 | Leydier et al. | | 235/492 |
| 2002/0078283 A1 | 6/2002 | Purcell et al. | | 710/109 |

(Continued)

FOREIGN PATENT DOCUMENTS

EP 0 356 237 2/1990

(Continued)

OTHER PUBLICATIONS

"*Universal Serial Bus Specification—Revision 2.0,*" Chapters 5 and 8, Apr. 27, 2000, 108 pages.

Primary Examiner—Michael J Yigdall
(74) Attorney, Agent, or Firm—Lisa K. Jorgenson; Christopher F. Regan

(57) ABSTRACT

The present invention is a smart card device that can be debugged and software developed using at least one interrupt endpoint without adding an additional port. At least one memory stores a debug monitor program and instructions for completing smart card transactions. An interface is defined by a plurality of communication pipes and respective endpoints, including at least one interrupt endpoint. A microprocessor is operatively connected to the interface and memory and configures the interrupt endpoint as a debug port for debugging and software development using the debug monitor program.

46 Claims, 4 Drawing Sheets

U.S. PATENT DOCUMENTS

2003/0037225 A1  2/2003  Deng et al. .................. 712/227
2003/0120970 A1* 6/2003  Chen ........................... 714/25

FOREIGN PATENT DOCUMENTS

| FR | 2 667 419 | 10/1990 |
| WO | WO 99/49415 | 9/1999 |
| WO | 00/68797 | 11/2000 |
| WO | WO 01/96990 | 12/2001 |

* cited by examiner

SMART CARD DEVICE AND METHOD FOR DEBUG AND SOFTWARE DEVELOPMENT

FIELD OF THE INVENTION

This invention relates to the field of smart card devices, and more particularly, this invention relates to debugging and software development of smart card devices.

BACKGROUND OF THE INVENTION

Smart cards are plastic cards having an embedded Integrated Circuit (IC). That IC may be a logic circuit with its associated memories or a microcontroller with its associated memories and software, or a microcontroller with its associated memories and software coupled to a custom circuit block or interface.

To use the computing power of the IC, a smart card makes use of a full set of packaging technologies. For example, the die size varies from 1 $mm^2$ to 30 $mm^2$, but is limited because of the mechanical limitations imposed by the plastic construction of the smart card. The IC is attached to a lead frame and wire-bonding techniques are used to connect the IC pads to the lead frame contacts. Potting or other strengthening methods can be used to protect the IC against chemical and mechanical stresses during manufacturing and which are a part of everyday usage of a smart card.

Eight contacts are typically located on one side of the card. The smart card performs transactions with a smart card reader using a serial protocol. The mechanical and electrical specifications for a smart card are published by the International Standard Organization (ISO) as ISO7816-X standards, which have allowed the simple and mass produced magnetic stripe cards to evolve toward the smart card. This natural evolution has allowed smart cards, depending on the IC complexity, of course, to perform pre-paid accounting, cryptographic scheme, personal authentication using a PIN code, biometrics, and java scripts, for example.

ISO documents ISO 7816-1 Physical Characteristics, ISO 7816-2 Dimensions and Locations of the contacts, ISO 7816-3 Electronic signals and transmission protocols, ISO 7816-4 Interindustry Commands for Interchange, and ISO 7816-10 Electronic signals and answer to reset for synchronous cards are incorporated herein by reference.

In operation, smart card readers are recognized by the reader infrastructure or a host computer prior to performing any transaction involving a smart card. The infrastructure runs an application involving the smart card. The half duplex protocol between the smart card and the smart card reader, in which either the smart card sends information to the smart card reader or vice versa, cannot start until a smart card is in place and detected by the smart card reader. The infrastructure manages authentication or transactions for pre-paid cards in public telephony, for Bankcards in Point-of-Sale (POS) terminals and Automatic Teller Machines (ATM), for Pay TV providers in set top boxes, and for wireless telecom operators in Subscriber Identification Modules (SIM) used in Global System for Mobile (GSM) terminals. Except for SIM cards, all other smart card reader applications use a physical sensor to detect the smart card. This sensor tells the smart card reader when a smart card is in place, i.e., when the smart card lead frame contacts mate with the smart card reader contacts.

When the smart card reader has established that a smart card is in place, a power-up sequence begins. After this power-up sequence has finished, the smart card reader typically provides a clock to the smart card and releases a reset signal. The smart card then executes its stored Operating System (OS). The SIM card, on the other hand, is in place only once with the power-off and used constantly subsequent to its positioning.

The first application for smart card technology was the public telephone system. The smart card die size was typically less than 1 $mm^2$, and only memories and logic circuits were integrated in the IC. The smart card reader used all eight contacts to interface properly with the different smart card generations. When the smart card was inserted in the payphone, the telephone infrastructure authenticated the smart card and the telephone removed accounting "units" from the smart card.

The banking industry subsequently adopted smart cards. The die size was about 10 $mm^2$, and a microcontroller and its associated memories and software were integrated in the IC. The smart card reader used up to six contacts to interface properly with the different smart card generations. When a smart card was inserted in the ATM or the POS (point-of-sale), the smart card user was authenticated with a PIN code. The smart card could store different items, such as the balance of cash received from an ATM on a per week basis or details of purchases since a last closing date. Based on this information, authorization could be issued on the spot once the PIN had authenticated the debtor. This was accomplished without telephone calls to the bank.

Another application for smart cards has been developed by GSM manufacturers. The die size in a SIM is about 30 $mm^2$, and a microcontroller and its associated memories and software are integrated in the IC. The SIM reader uses five contacts to interface properly with the smart card. The more sophisticated smart card applications are performed in GSM using Java applets.

A new market for the smart card has emerged with the growth of the internet accessed from a personal computer. Secure message, Public Key Infrastructure, Authentication and Electronic Payment are new smart card areas of interest. The smart card acts as an e-commerce facilitator. One advantage of a smart card compared to other solutions is the smart card PIN located in its memory that is never communicated in any transaction.

Presently, a smart card is inserted into a smart card reader connected to a host computer. Two protocols are involved in supporting transactions between the smart card and host computer. The first protocol complies with the ISO-7816-3, which provides detailed requirements for the serial interface between smart card and smart card reader. The reader is connected to the computer via a serial port, a parallel port, or the Universal Serial Bus (USB), using a second protocol. The smart card reader contains electronic circuits and embedded software that enable communication between the smart card using the first protocol and the host computer using the second protocol. The host computer is loaded with any appropriate drivers to support the smart card reader.

Many countries have begun to use the smart card in the PC environment. The die size used in these applications ranges from 5 $mm^2$ to 30 $mm^2$, and the microcontroller and its associated memories and software are integrated in the IC typically with a cryptocontroller. Sometimes, a bio-sensor is integrated. The smart card reader uses at least five contacts to interface properly with the smart card in these applications.

Since the late 1990's, the universal serial bus (USB) has become firmly established and has gained wide acceptance in the PC marketplace. The USB was developed in response to a need for a standard interface that extends the concept of "plug and play" to devices external to a PC. It has enabled users to install and remove external peripheral devices without opening the PC case or removing power from the PC. The USB provides a low-cost, high performance, half-duplex serial interface that is easy to use and readily expandable.

USB uses four wires. The power supply is carried with two wires (VBus and ground), and data is carried with the other two wires (D+, D−). The latest version of the USB is currently defined by the Universal Serial Bus Specification Revision 2.0, written and controlled by USB Implementers Forum, Inc., a non-profit corporation founded by the group of companies that developed the USB Specification and is incorporated herein by reference. The increasingly widespread use of the USB has led smart card reader manufacturers to develop USB interfaces for connection of their products to host computers to complement the existing serial and parallel interfaces.

For cost and security, the smart cards typically only support a USB port without any ISO 7816 interface operating simultaneously. As a result, there is no means to debug and encode/decode software running in the smart card memory using only one port. Debugging code using an extra port, such as the serial interface, adds to the overall cost on the reader side because the reader must be ready for both USB and serial links. One solution is the use of a Joint Test Action Group (JTAG) port to allow debugging of silicon and software. One drawback in the use of this port is the requirement that more than eight ISO contact pins are often necessary.

SUMMARY OF THE INVENTION

It is therefore an object of the present invention to provide a smart card device that can be debugged and software developed in a secure manner without requiring additional pins or contacts than are normally used.

It is another object of the present invention to provide a smart card device that can be debugged and software developed in a secure manner.

The present invention advantageously provides a debug port for debugging and software development for a smart card device, such as a USB smart card operating in a USB mode as user mode. The security of a smart card is guaranteed because the debugging port is the same as the primary port. The present invention makes use of multiple pipe capabilities of the USB protocol, in one aspect of the present invention.

In accordance with the present invention, an integrated circuit is used in a smart card device as part of a smart card system. The smart card device preferably comprises a USB smart card, and can be debugged and software developed. At least one memory stores a debug monitor program and instructions relating to initiating and completing smart card transactions with the host. An interface is defined by a plurality of endpoints and communicates with the host through respective communication pipes, including at least one interrupt endpoint. The microprocessor is operatively connected to the interface and memory and operative for configuring the interrupt endpoint as a debug port for debugging and software development using the debug monitor program.

In yet another aspect of the present invention, the data transmitted or received to or from the host for debugging passes through the interrupt endpoint. This endpoint can be formed as two interrupt endpoints that are configured respectively as interrupt-in and interrupt-out endpoints or single interrupt endpoint configured by the host as either an interrupt-in or interrupt-out endpoint.

In yet another aspect of the present invention, the integrated circuit includes a plurality of program op codes. The debug monitor program is operative for modifying the program op codes to use either a break instruction or an illegal op code. A current program counter value can also be transmitted through the interrupt endpoint and allow the host to retrieve any context of a program that is debugged. All interrupts, except that required for debugging, can also be disabled during a break point.

In yet another aspect of the present invention, the debug monitor program is operative for supporting the setting and removing of a break point, setting a memory address, and retrieving data from the memory address. It is also operative for resetting a register with the provided data and retrieving data from the register.

In yet another aspect of the present invention, the debug monitor program is operative for starting a program execution, stopping a current program execution, and restarting a program execution from a current address. It can also be operative for executing a program until a provided address is reached. It is also operative for stepping an instruction.

In a method aspect of the present invention, the method comprises the step of configuring at least one interrupt endpoint as a debug port and transferring data used for debugging by a host through the interrupt endpoint. The method further comprises the step of configuring the interrupt endpoint as an interrupt-in or interrupt-out endpoint. Two interrupt endpoints can be used and, if a single interrupt endpoint is used, it can be configured based on instructions received from the host.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously provides a debug port for a smart card device, such as a USB smart card operating in USB mode and user mode. The security of the smart card is guaranteed because the debugging port is the same as the primary port used for communication and operation. The present invention makes use of the multiple pipe capabilities of the USB protocol.

Figure 1:
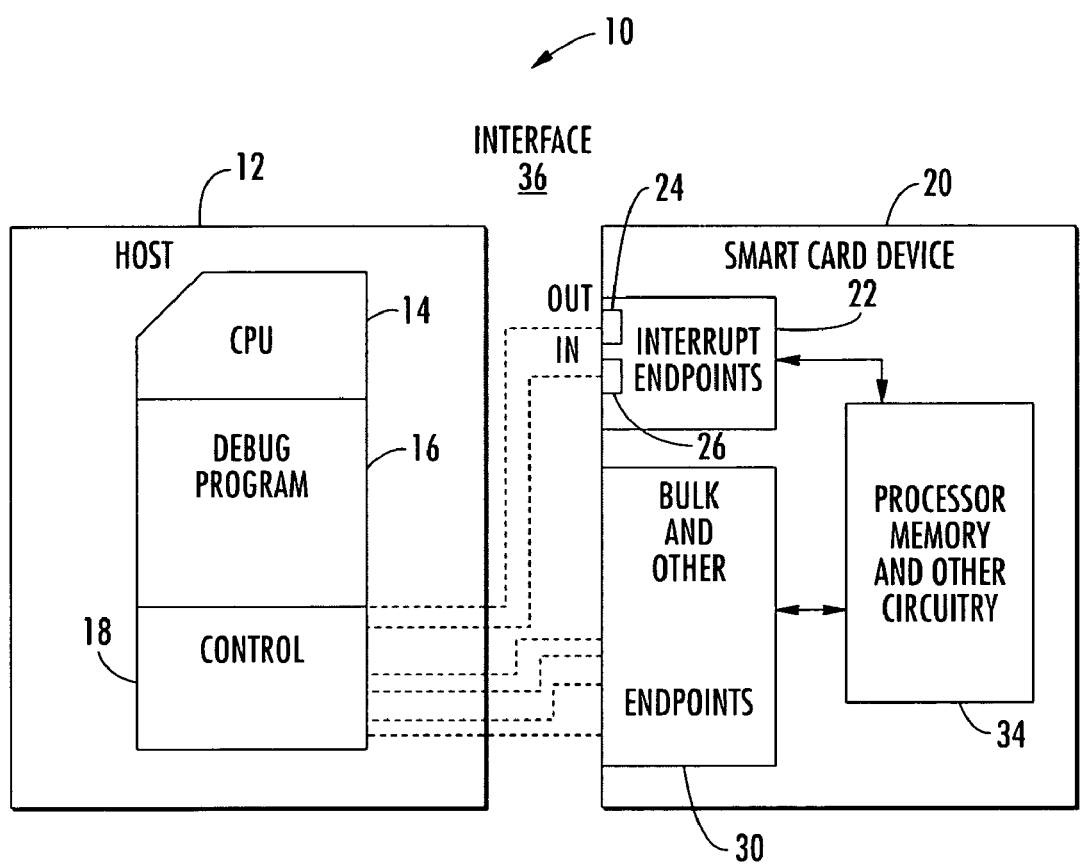
FIG. 1 is a block diagram showing a host and smart card device and communication pipes, including two interrupt endpoints configured for debugging and software development.

FIG. 1 is a block diagram showing the smart card system 10 of the present invention and showing a host 12, such as a personal computer, including a CPU 14 and a debugger program 16 and control circuitry 18 for a smart card device 20 such as a USB smart card. The smart card device 20 has interrupt endpoints 22, including an interrupt-out 24 and interrupt-in 26 endpoint used for debugging. The smart card device 20 includes other bulk and other endpoints 30 used for communications. The processor, memory and other smart card circuitry 34 are operatively connected to the interrupt endpoints 22 and bulk and other endpoints 30. An interface 36 is defined between the host 12 and device 20.

Figure 2:
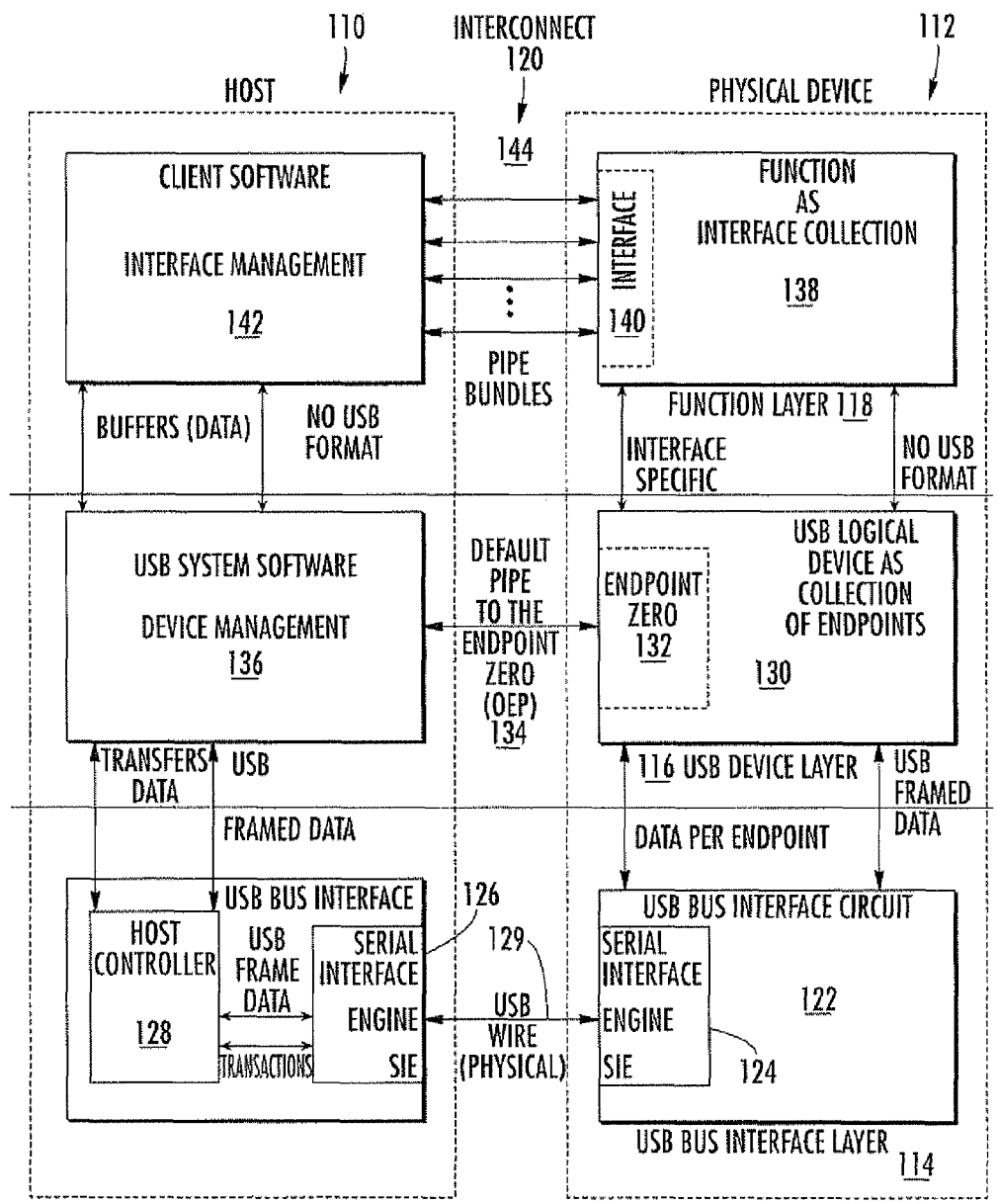
FIG. 2 is a block diagram of a USB showing the different data transport mechanisms, pipes and a USB-relevant format of transported data between the host and interconnective physical device as taught in the universal serial bus specification revision 2.0.

For purposes of background and description, the basic USB data flow between a USB host and a USB device and the various implementations and layers in accordance with the universal serial bus specification 2.0 are set forth in FIG. 2.

As shown in FIG. 2, the connection of a host 110 to a physical device 112 requires the interaction between different layers, i.e., the USB bus interface layer 114, USB device layer 116, and function layer 118. An interconnect 120 between the host and device is illustrated.

The USB bus interface layer 114 includes a USB bus interface circuit 122 and serial interface engine (SIE) 124 at the device 112 that communicates with a serial interface engine (SIE) 126 and its host controller 128 at the host 110 via a physical wire 129. The USB device layer 116 includes at the physical device 112 a collection of endpoints as a USB logical device 130. An endpoint zero 132 is operable in communication via the default pipe 134 to USB system software 136 that is operable for device management at the host 110. The function layer 118 includes at the physical device 112, a logical function 138 as an interface collection, and the interface 140 that communicates via a plurality of pipe bundles 144 to client software 142 that is operable for interface management.

The USB bus interface layer 114 provides the physical wire 129 for the traffic signaling and packet conductivity between the host 110 and physical device 112. The USB device layer 116 views the USB system software 136 to perform generic USB operations with the physical device 112 via the default pipe 134 to endpoint zero 132. The functional layer 118 adds capabilities to the host using matched client software. The USB Device Layer 116 and Function Layer 118 each view logical communications within their layers and use the USB Bus Interface Layer 114 for any data transfer. The USB host 110 coordinates the overall USB system, controls access, and monitors the USB topology.

Logical communications exist between the client software and the Function Layer 118 and the USB system software 136 and USB logical device 130. Actual packets flow between the USB host controller 128 and the USB bus interface circuit 122.

As is known, USB physical devices add functionality to the host and have the same interface. Each physical device carries and reports configuration-related data, which it forwards to the host to allow the host to identify and configure the USB device. Typically, devices on the USB are connected to a host using a tiered star topology, including the hub. The host, on the other hand, communicates with each logical device as if it were directly connected to a root port. The client software manipulates a USB function interface of a device only as an interface of interest.

It should be understood that the actual communication flows across several interface boundaries. The two software interfaces for the host are a host controller driver (HCD) and a USB driver (USBD). A software interface between a USB host controller 178 and USB system software 176 implements the host controller driver and allows the host controller to implement functions without requiring the host software to be dependent on any particular implementation. One USB driver can support different host controllers. Specific knowledge of a host controller implementation is not required.

The USB logical device 130 can be considered a collection of endpoints and are grouped into endpoint sets to implement the interface. The USB system software 136 manages or controls the device using the default pipe 134 to the endpoint zero 132. Client software 142 manages the interface using pipe bundles 144 associated with an endpoint set. Data is moved between a buffer on the host 110 and an endpoint on the USB device 112 when client software requests the data. The host controller 128 or USB device 112, depending on the direction of data transfer, packetizes the data and forwards the packets over the bus. It also coordinates bus access. The host communicates with the physical device using a desired communication that is designed to match any communication requirements of the physical device and transfer characteristics provided by a USB.

The endpoint is an identifiable portion of the device that terminates the communication between the host. It can be a collection of independent endpoints. Default control uses input and output endpoints and the endpoint number "zero" as part of the default pipe 134.

The data transport mechanism includes transfers of data between the host controller 128 and the USB system software 136 at the host 110. Buffers can be used as a data transport mechanism between the USB system software 136 and the client software 142 at the host 110. The other data transport mechanism includes transactions between the host controller 128 and the serial interface engine 126 within the USB bus interface of the host.

The data transport mechanism also exists as a data per endpoint between the USB bus interface circuit 122 and the USB logical device 130 at the physical device 112. The data transport mechanism between the function 138 (and with the interface 140) and the endpoint zero 132 is interface-specific.

USB-relevant format of transported data occurs as USB frame data between the serial interface engine 126 and the host controller 128 and between the host controller 128 and the USB system software 136 at the host 110. No USB format for transporting data exists between the client software 142 that manages an interface and the USB system software 136.

At the device 112, USB-relevant format of transported data exists as USB frame data between the USB bus interface circuit 122 and the USB logical device 130. No USB format of data occurs between the interface 140 and the endpoint zero 32 at the device 112.

Further details of the functioning of the USB host and device and data flow can be found in the Universal Serial Bus Specification Revision 2.0, including Chapter 5 entitled "USB Dataflow Model," the disclosure for the entire Specification Revision 2.0 which is hereby incorporated by reference in its entirety.

In the present invention, to detect the debugging pipe, a hardware interrupt is required. This interrupt is routed to a dedicated interrupt channel if the central processor unit supports the interrupt and channel. If the hardware is not able to support any dedicated interrupt channel, the embedded software monitor distinguishes between an application's interrupt and a debug interrupt.

As taught in the USB specification, an interrupt endpoint can be configured either in input or output stream (interrupt-in or interrupt-out) and the debug protocol uses both directions. Also, the embedded monitor and the host debugger support the following basic commands:

a) set breakpoint: set a breakpoint at a memory address;
b) remove breakpoint: remove a breakpoint at a memory address;
c) set memory: set a memory address with provided data;
d) get memory: get data from memory address;
e) set register; set a given register with provided data;
f) get register: get data from a register;
g) run: start program execution;
h) continue: restart program execution from current address;
i) until: execute program until the provided address is reached;
j) step instruction: execute a single instruction; and
k) stop: stop the current program execution.

In the present invention, an asynchronous stop is usually possible only if two endpoints are enabled at the same time.

The debugging system of the present invention operates in a master/slave manner. The master is the PC host and the slave is the embedded monitor. The interrupt constraint usually occurs only periodically. There is no technical restriction on using either one or two interrupt endpoints. If two endpoints are used, one endpoint is an interrupt-in endpoint and operative to transfer data in the input direction and the other endpoint is an interrupt-out endpoint and transfers data in the output direction. This mechanism is not difficult to facilitate. When using only one endpoint, however, the host changes the definition of the endpoint when it wants to modify the data direction. This adds complexity during implementation, but saves one endpoint. This trade-off is up to the implementer of the overall design.

It is important that the embedded monitor not modify the context of the running program (that is debugged/developed) and the monitor will run in its own context.

The program should operate in a non-volatile memory, such as EEPROM. This will allow the monitor to modify the program opcodes in order to use either a "break" instruction, which is supported by almost any CPU, or an illegal opcode. When the active program reaches an opcode, the CPU is forced to enter into the monitor context. At this point, the system faces a common issue with USB: the monitor itself cannot send back information directly to the host. The monitor polls for the next interrupt. When this event arises, it sends bac to the host a handshake code corresponding to:

a) a breakpoint has been reached, or
b) an asynchronous event stopped the program execution.

Along with this information, the embedded monitor sends the current program counter value to help the host retrieve the exact context of the program. After that, the host initiates a new handshake through the interrupt endpoint to retrieve the required information. During a breakpoint, the CPU's interrupts are disabled except for one used for debugging. The host sends and receives all the required information to process the debugging task.

The debugging protocol is important when the system enters into the "monitor context." At this point, the running program is stopped and it will resume another time only if the user on the debugger side requests the resumption. The device is kept active to avoid a suspended condition while everything is stopped. By using an interrupt endpoint of the invention, the USB functionality is automatically accomplished by virtue of the interrupt frequency. This invention enables the feature of performing on-chip debugging at the source level and to do so with minimal hardware extra costs, if any.

Figure 3:
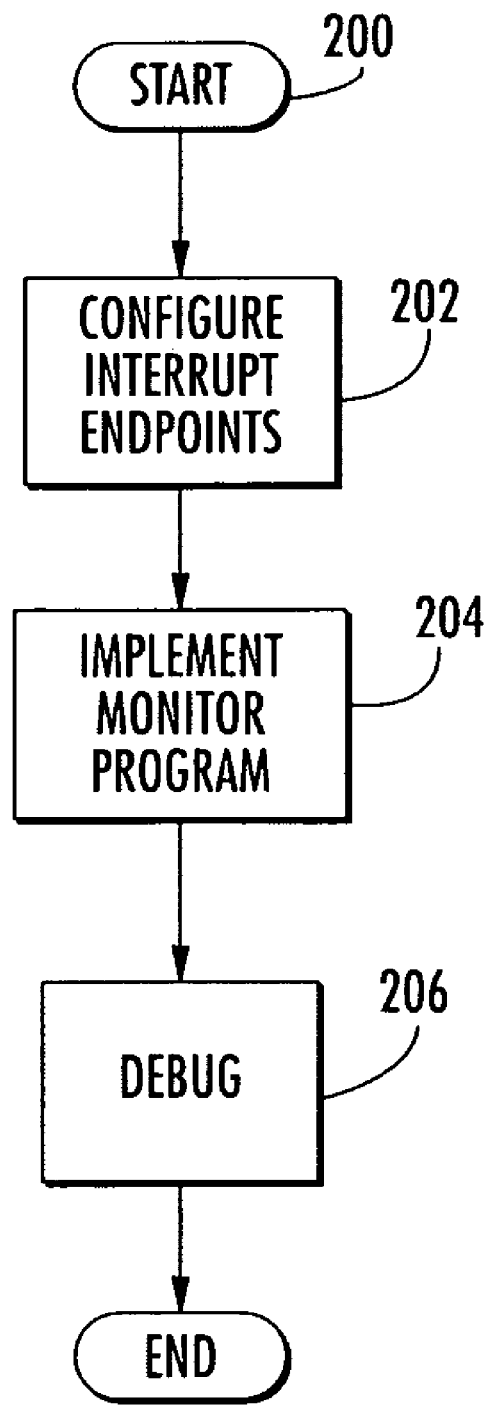
FIG. 3 is a high level flow chart showing one example of a method of operation of the present invention.

FIG. 3 is a high level flow chart showing one method of the present invention that starts (block 200), such as detecting the card and then configuring interrupt endpoints by the host debug program (block 202) and associated software and firmware. The monitor program is implemented (block 204) and debugging occurs (block 206). The process ends after debugging (block 208).

Figure 4:
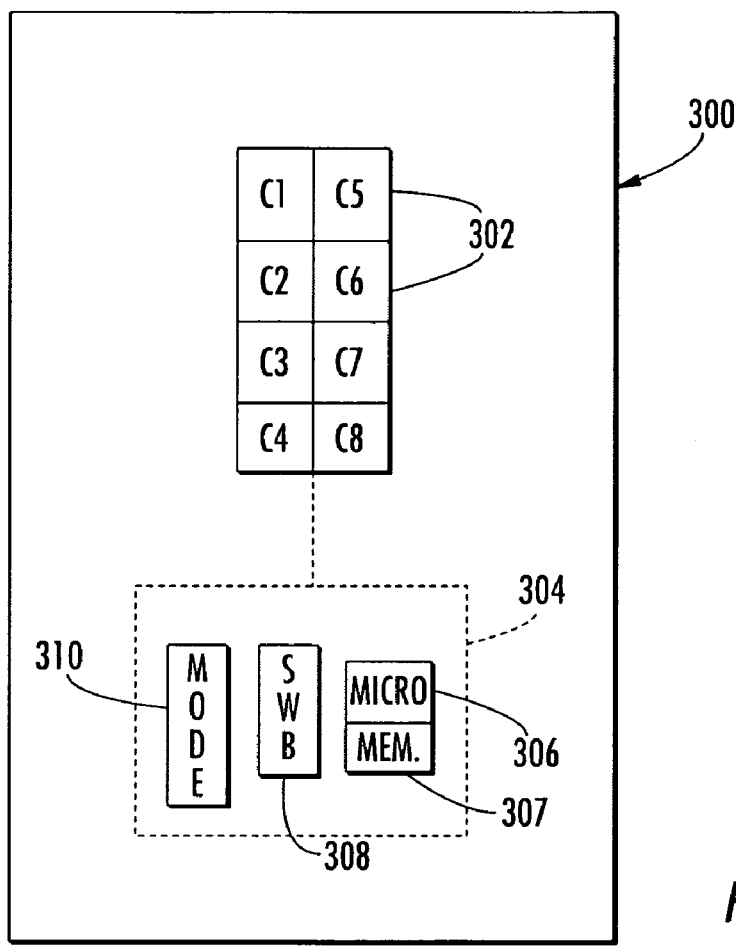
FIG. 4 is a block diagram of a smart card device that can be used in the present invention.

Many different types of smart card devices can be used in the present invention, including smart card tokens. One type of smart card device that can be used or modified for use with the present invention is disclosed in U.S. Pat. No. 6,439,464 to Fruhauf et al., the disclosure which is hereby incorporated by reference in its entirety. As shown in FIG. 4, the smart card device 300 is typically made of plastic and includes a plurality of electrical contacts or pads 302 that are positioned on the outer surface. For example, eight contacts or pads (C1 through C8) could be used. The pads are an external interface for the integrated circuit (IC) 304, which is embedded within the card and typically beneath the pads. The size of the card and position of the pads are usually determined by appropriate standards, such as ISO 7816 protocol. Naturally, the IC can be embedded in other media such as a subscriber identity module (SIM) used with module phones, tokens or other wireless USB devices.

It should be understood that the integrated circuit (IC) can be a dual-mode IC that includes a microprocessor 306 and memory 307, a switching block 308, mode configuration circuit 310, and the external interface formed by the contacts 302 (C1 through C8). These contacts could include a voltage supply pad VCC, a reference voltage/ground pad GND, a first set of pads for an ISO mode and a second set of pads for a non-ISO mode, such as a USB mode. This first set of pads can include a reset pad RST, a clock pad CLK, and an input/output I/o pad in accordance with the ISO 7816 protocol. A second set of pads could include a D+ pad, DP and a D− pad DM in accordance with a USB protocol.

A dual mode IC could be capable of operating in a first mode, such as the ISO mode, in accordance with the International Standard Organization 7816 (ISO 7816) protocol and a second non-ISO mode such as the USB mode in accordance with the Universal Serial Bus (USB) protocol as noted before. A dual-mode IC could operate selectively in one mode or the other, but typically not both modes simultaneously. A dual-mode smart card device could include, for example, mode detection circuits, USB voltage detector, latching circuits, control registers, delay blocks, pull up resistors, and other configuration and control circuits as set forth in the incorporated by reference '464 patent.

Figure 5:
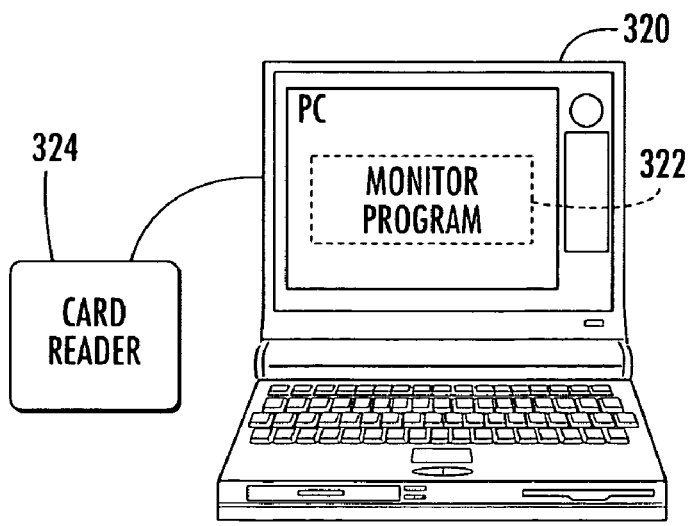
FIG. 5 is a block diagram of a personal computer and showing a smart card device of the present invention inserted into a USB reader.

As shown in FIG. 5, a personal computer 320 includes the monitor debug program 322, which could be an embedded program. The central processing unit of the computer is operative with various input/output devices, such as the monitor, keyboard and mouse. A USB port is operative with a smart card reader 324 and receives the smart card device. Debugging and software development occurs through the interrupt as described before.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An integrated circuit for use in a smart card device that can be debugged comprising:

at least one non-volatile memory that stores a debug monitor program and instructions relating to initiating and completing smart card transactions with a host and operative with an active program to be debugged;

an interface including a plurality of communication pipes and a plurality of endpoints that communicate with a host through respective communication pipes, including at least one interrupt endpoint; and a processor operatively connected to the interface and non-volatile memory wherein said processor is operative for configuring the interrupt endpoint as a debug port for debugging the active program using the debug monitor program wherein the debug monitor program is configured to run in its own context and wherein the debug monitor program and processor are configured to modify program opcodes to use an illegal opcode, wherein as the active program reaches such opcode, the processor enters a debug monitor program context and polls for a next interrupt, and when it occurs, the debug monitor program is configured to send back to the host a handshake code indicating that a breakpoint has been reached or an asynchronous event stopped program execution, and said processor is configured to transmit through the interrupt endpoint a current program counter value allowing the host to retrieve any context of a program that is debugged.

2. An integrated circuit according to claim 1, wherein any data transmitted or received to or from the host for debugging passes through said interrupt endpoint.

3. An integrated circuit according to claim 1, wherein said at least one interrupt endpoint comprises two interrupt endpoints configured respectively as an interrupt-in and interrupt-out endpoint.

4. An integrated circuit according to claim 3, wherein said interrupt endpoint is changed between interrupt-in and interrupt-out based on instructions received from a host.

5. An integrated circuit according to claim 1, wherein said at least one interrupt endpoint comprises a single interrupt endpoint configured as either an interrupt-in or interrupt-out endpoint.

6. An integrated circuit according to claim 1, wherein said processor is operative during a breakpoint for disabling all interrupts except that required for debugging.

7. An integrated circuit according to claim 1, wherein said debug monitor program is operative for supporting the setting and removing of breakpoints.

8. An integrated circuit according to claim 1, wherein said debug monitor program is operative for setting a memory address and retrieving data from the memory address.

9. An integrated circuit according to claim 1, wherein said debug monitor program is operative for setting a register with provided data and retrieving data from the register.

10. An integrated circuit according to claim 1, wherein said debug monitor program is operative for starting a program execution, stopping a current program execution, and restarting a program execution from a current address.

11. An integrated circuit according to claim 1, said debug monitor program is operative for executing a program until a provided address is reached.

12. An integrated circuit according to claim 1, wherein said debug monitor program is operative for stepping an instruction.

13. A smart card device that can be debugged comprising:
a card body;
an integrated circuit carried by said card body and comprising,
at least one non-volatile memory that stores a debug monitor program and instructions relating to initiating and completing smart card transactions with a host and operative with an active program to be debugged;

an interface including a plurality of communication pipes and endpoints that communicate with a host through respective communication pipes, including at least one interrupt endpoint, and a processor operatively connected to the interface and non-volatile memory wherein said processor is operative for configuring the interrupt endpoint as a debug port for debugging the active program using the debug monitor program wherein the debug monitor program is configured to run in its own context and wherein the debug monitor program and processor are configured to modify program opcodes to use an illegal opcode, wherein as the active program reaches such opcode, the processor enters a debug monitor program context and polls for a next interrupt, and when it occurs, the debug monitor program is configured to send back to the host a handshake code indicating that a breakpoint has been reached or an asynchronous event stopped program execution, and said processor is configured to transmit through the interrupt endpoint a current program counter value allowing the host to retrieve any context of a program that is debugged.

14. A smart card device according to claim 13, and further comprising a plurality of contact pads carried by said card body and operative with the interface for interfacing with a smart card reader.

15. A smart card device according to claim 13, wherein any data transmitted or received to or from the host for debugging passes through said interrupt endpoint.

16. A smart card device according to claim 13, wherein said at least one interrupt endpoint comprises two interrupt endpoints configured respectively as an interrupt-in and interrupt-out endpoint.

17. A smart card device according to claim 16, wherein said interrupt endpoint is changed between interrupt-in and interrupt-out based on instructions received from a host.

18. A smart card device according to claim 13, wherein said at least one interrupt endpoint comprises a single interrupt endpoint configured as either an interrupt-in or interrupt-out endpoint.

19. A smart card device according to claim 13, wherein said processor is operative during a breakpoint for disabling all interrupts except that required for debugging.

20. A smart card device according to claim 13, wherein said debug monitor program is operative for supporting the setting and removing of breakpoints.

21. A smart card device according to claim 13, wherein said debug monitor program is operative for setting a memory address and retrieving data from the memory address.

22. A smart card device according to claim 16, wherein said debug monitor program is operative for setting a register with provided data and retrieving data from the register.

23. A smart card device according to claim 13, wherein said debug monitor program is operative for starting a program execution, stopping a current program execution and restarting a program execution from a current address.

24. A smart card device according to claim 13, wherein said debug monitor program is operative for executing a program until a provided address is reached.

25. A smart card device according to claim 13, wherein said debug monitor program is operative for stepping an instruction.

26. A smart card system that can be debugged comprising:
a host having a debugger program;

a smart card to be debugged by the debugger program and comprising at least one non-volatile memory that stores a debug monitor program and instructions relating to initiating and completing smart card transactions with the host and operative with an active program to be debugged, an interface including a plurality of communication pipes and endpoints that communicate with the host through respective communication pipes, including at least one interrupt endpoint, and a processor operatively connected to the interface and non-volatile memory wherein said processor is operative for configuring the interrupt endpoint as a debug port for debugging the active program using the debug monitor program wherein the debug monitor program is configured to run in its own context and wherein the debug monitor program and processor are configured to modify program opcodes to use an illegal opcode, wherein as the active program reaches such opcode and the processor enters a debug monitor program context and polls for a next interrupt, and when it occurs, the debug monitor program is configured to send back to the host a handshake code indicating that a breakpoint has been reached or an asynchronous event stopped program execution, and said processor is configured to transmit through the interrupt endpoint a current program counter value allowing the host to retrieve any context of a program that is debugged.

27. A smart card system according to claim 26, wherein any data transmitted or received to or from the host for debugging passes through said interrupt endpoint.

28. A smart card system according to claim 26, wherein said at least one interrupt endpoint comprises two interrupt endpoints configured respectively as an interrupt-in and interrupt-out endpoint.

29. A smart card system according to claim 26, wherein said interrupt endpoint is changed based on instructions received from a host.

30. A smart card system according to claim 28, wherein said at least one interrupt endpoint comprises a single interrupt endpoint configured as an interrupt-in or interrupt-out endpoint.

31. A smart card system according to claim 26, wherein said processor is operative during a breakpoint for disabling all interrupts except that required for debugging.

32. A smart card system according to claim 26, wherein said debug monitor program is operative for supporting the setting and removing of breakpoints.

33. A smart card system according to claim 26, wherein said debug monitor program is operative for setting a memory address and retrieving data from the memory address.

34. A smart card system according to claim 26, wherein said debug monitor program is operative for setting a register with provided data and retrieving data from the register.

35. A smart card system according to claim 26, wherein said debug monitor program is operative for starting a program execution, stopping a current program execution and restarting a program execution from a current address.

36. A smart card system according to claim 26, wherein said debug monitor program is operative for executing a program until a provided address is reached.

37. A smart card system according to claim 26, wherein said debug monitor program is operative for stepping an instruction.

38. A method of debugging a smart card device having a debug monitor program comprising the steps of:

providing an integrated circuit of the smart card device having at least one non-volatile memory that stores a debug program and instructions relating to initiating and completing smart card transactions with a host and operative with an active program to be debugged, and further comprising an interface including a plurality of communication pipes and a plurality of endpoints that communicate with a host through respective communication pipes, including at least one endpoint, and a processor connected to the interface and non-volatile memory, wherein the processor configures at least one interrupt endpoint as a debug port; and transferring data used for debugging by a host through the interrupt endpoint and running the debug monitor program in its own context and modifying through the debug monitor program and the processor program opcodes so as to use illegal opcodes, wherein as the active program reaches such opcode and the processor enters a debug monitor program context and polls for a next interrupt, and when it occurs, the debug monitor program is configured to send back to the host a handshake code indicating that a breakpoint has been reached or an asynchronous event stopped program execution, and said processor is configured to transmit through the interrupt endpoint a current program counter value allowing the host to retrieve any context of a program that is debugged.

39. A method according to claim 38, and further comprising the step of configuring the interrupt endpoint as an interrupt-in or interrupt-out endpoint.

40. A method according to claim 38, and further comprising the step of configuring the interrupt endpoint based on instructions received from the host.

41. A method according to claim 39, and further comprising the step of disabling all interrupts except that required for debugging.

42. A method according to claim 39, wherein the debug monitor program supports the setting and removing of breakpoints.

43. A method according to claim 39, wherein the debug monitor program sets a memory address and retrieves data from the memory address.

44. A method according to claim 39, wherein the debug monitor program sets a register with provided data and retrieves data from the register.

45. A method according to claim 39, wherein the debug monitor program starts a program execution, stops a current program execution and restarts a program execution from a current address.

46. A method according to claim 39, wherein the debug monitor program executes a program until a provided address is reached.

* * * * *